US008743907B1

(12) United States Patent  
Kadosh et al.

(10) Patent No.: US 8,743,907 B1
(45) Date of Patent: Jun. 3, 2014

(54) APPARATUS FOR REASSEMBLING A FRAGMENTED DATA UNIT AND TRANSMITTING THE REASSEMBLED DATA UNIT

(75) Inventors: Aviran Kadosh, Misgav (IL); Denis Krivitski, Nazareth Illit (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 203 days.

(21) Appl. No.: 12/359,965

(22) Filed: Jan. 26, 2009

Related U.S. Application Data

(60) Provisional application No. 61/023,993, filed on Jan. 28, 2008.

(51) Int. Cl.
*H04J 3/24* (2006.01)
*H04L 12/28* (2006.01)

(52) U.S. Cl.
USPC .......................................... 370/474; 370/394

(58) Field of Classification Search
USPC .......................................... 370/474, 392, 394
See application file for complete search history.

(56) References Cited

U.S. PATENT DOCUMENTS

| | | | |
|---|---|---|---|
| 5,590,122 A * | 12/1996 | Sandorfi et al. | 370/394 |
| 6,781,992 B1 * | 8/2004 | Rana et al. | 370/394 |
| 6,795,866 B1 * | 9/2004 | Mankude et al. | 709/238 |
| 6,912,217 B1 * | 6/2005 | Vogel | 370/389 |
| 7,027,443 B2 * | 4/2006 | Nichols et al. | 370/394 |
| 7,349,437 B2 | 3/2008 | Horton et al. | |
| 7,486,673 B2 * | 2/2009 | Harijono et al. | 370/389 |
| 7,583,673 B2 * | 9/2009 | Liu | 370/392 |
| 7,685,121 B2 * | 3/2010 | Brown et al. | 707/999.006 |
| 2002/0024963 A1 * | 2/2002 | Reeve | 370/412 |
| 2003/0081624 A1 * | 5/2003 | Aggarwal et al. | 370/412 |
| 2006/0013258 A1 * | 1/2006 | Banerjee et al. | 370/474 |
| 2006/0187834 A1 * | 8/2006 | Nichols et al. | 370/230 |
| 2006/0262808 A1 * | 11/2006 | Lin et al. | 370/466 |
| 2008/0304485 A1 * | 12/2008 | Sinha et al. | 370/392 |

OTHER PUBLICATIONS

Paul Simoneau, The OSI Model: Understanding the Seven Layers of Computer Networks, 2006, Global Knowledge Training LLC, pp. 1-11.*
A. Tanenbaum "Computer Networks," Fourth Edition, Vrije Universiteit, Amsterdam, The Netherlands, Prentice Hall PTR (2003), pp. 426-431.

* cited by examiner

*Primary Examiner* — Mark Rinehart
*Assistant Examiner* — Angel Brockman

(57) ABSTRACT

An apparatus includes a receive port unit, a forwarding engine, a transmit port unit, and a reassembly unit. In an embodiment, the packet reassembly unit examines headers in received fragments of a data unit and using the headers to reassemble the data unit, wherein the headers correspond to a protocol layer above an IP-layer. In another embodiment, the packet reassembly unit is located downstream from the forwarding engine in a packet forwarding pipeline, and the forwarding engine skips processing fragments received subsequent to a first received fragment.

16 Claims, 9 Drawing Sheets

| CONTEXT INDEX | DATA UNIT IDENTIFIER | AVAILABILITY | FIRST FRAGMENT | AGING INDICATOR | DESCRIPTOR | ... |
|---|---|---|---|---|---|---|
| 410 | 420 | 430 | 440 | 450 | 460 | |
| . . . | . . . | . . . | . . . | . . . | . . . | . . . |

FIG. 4

APPARATUS FOR REASSEMBLING A FRAGMENTED DATA UNIT AND TRANSMITTING THE REASSEMBLED DATA UNIT

CROSS-REFERENCE TO RELATED APPLICATION

This application claims the benefit of U.S. Provisional Patent Application No. 61/023,993, entitled "Reassembly of Fragmented packets in a Switching Device," which was filed on Jan. 28, 2008, the entire disclosure of which is hereby incorporated by reference herein.

FIELD OF TECHNOLOGY

The present invention relates generally to communication networks and, more particularly, to fragmentation and reassembly of data units.

BACKGROUND

In communication networks, data units (e.g., packets) may be fragmented for various reasons. When fragmented data units are received, it may be necessary to efficiently reassembly the fragmented packets.

SUMMARY

The present disclosure provides methods and apparatus for reassembling fragmented data units.

In general, these methods and apparatus allow reassembly in hardware without resorting to exporting the fragments to a programmable processor for reassembly in software. A method of reassembling fragmented data units includes receiving multiple fragments of a data unit. The method also includes storing the fragments as a data unit linked list, including storing at least one of the fragments in at least two different memory segments as a fragment linked list. The method also includes transmitting a data unit that is reassembled using the data unit linked list and the fragment linked list.

In various implementations, one or more of the following features may be included. Transmitting a data unit may include forwarding the reassembled unit based on header data included in the first fragment. Transmitting a data unit may also include forwarding the reassembled unit without processing header data included in fragments other than the first fragment.

The method may also include associating each of the fragments of the data unit with a reassembly context corresponding to the data unit. The method may also include binding a first fragment linked list with a second fragment linked list to create the data unit linked list. Binding the first fragment linked list with the second fragment linked list may include linking the end of a memory segment corresponding to the first fragment linked list with a beginning of a memory segment corresponding to the second fragment linked list. The memory segment corresponding to the first fragment linked list may include invalid data prior to the end of the memory segment corresponding to the first fragment linked list. The memory segment corresponding to the second fragment linked list may also include invalid data at the beginning of the memory segment corresponding to the second fragment linked list.

In another embodiment, an apparatus for reassembling fragmented data units includes a receive port unit to store fragments of a data unit received from a receive port in a memory, including storing at least one of the fragments in at least two different segments of the memory as a fragment linked list. The apparatus also includes a packet reassembly unit to create a data unit linked list corresponding to the fragments stored in the memory. The apparatus also includes a forwarding engine to determine a transmit port from which to transmit the data unit. The apparatus also includes a transmit port unit to transmit the data unit stored in the memory via the determined transmit port using the data unit linked list and the fragment linked list.

In another embodiment, a method of reassembling fragmented data units includes receiving multiple fragments of a data unit. The method also includes storing the fragments as a linked list, where one or more nodes of the linked list includes invalid data. The method also includes transmitting a reassembled data unit using the linked list, including skipping the invalid data. The invalid data may be data in a node of the linked list other then a last node. The invalid data may also be data in a beginning of a memory segment included in the linked list.

In another embodiment, an apparatus for reassembling fragmented data units includes a receive port unit to store multiple fragments of a data unit received from a receive port in a memory. The apparatus also includes a packet reassembly unit to create a linked list corresponding to the multiple fragments stored in the memory, where one or more nodes of the linked list include invalid data. The apparatus also includes a forwarding engine to determine a transmit port from which to transmit the data unit. The apparatus also includes a transmit port unit to transmit the data unit stored in the memory via the determined transmit port using the linked list and by skipping the invalid data. The invalid data may be data in a node of the linked list other than a last node of the linked list. The invalid data may also be data in a beginning of a memory segment included in the linked list.

In another embodiment, a method of reassembling fragmented data units includes receiving a data unit. The method also includes examining a header in the data unit to determine if the data unit is a fragment of a larger data unit, where the header corresponds to a protocol layer above an IP layer. The method also includes identifying one or more subsequent fragments of the larger data unit by examining one or more headers in data units, where the one or more headers correspond to the protocol layer above the IP layer. The method also includes determining whether the data unit is a fragment of a larger data unit, and, if so, reassembling the larger data unit after receiving one or more subsequent fragments of the larger data unit. The method also includes determining a transmit port from which to transfer the data unit. The data also includes forming a new header to the data unit. The method also includes transmitting the larger data unit via the determined transmit port. The header may correspond to the Control and Provisioning of Wireless Access Points (CAPWAP) protocol. The header may also correspond to the Lightweight Access Point Protocol (LWAPP) protocol.

In another embodiment, an apparatus for reassembling fragmented data units includes a receive port unit to receive data units. The apparatus also includes a packet reassembly unit to examine headers in received data units to determine if the received data units are fragments of a larger data unit and to reassemble the larger data unit after receiving all of the fragments of the larger data unit, where the headers correspond to a protocol layer above an IP layer. The apparatus also includes a forwarding engine to determine a transmit port from which the larger data unit should be transmitted. The apparatus also includes a transmit port unit to transmit the larger data unit stored in a memory via the determined transmit port.

In another embodiment, a method of reassembling fragmented data units includes receiving a data unit. The method also includes determining a transmit port for transmitting the data unit. The method also includes, after determining the transmit port, determining if the data unit is a fragment of a larger data unit. The method also includes determining whether the data unit is a fragment of a larger data unit, and, if so reassembling the larger data unit after receiving one or more subsequent fragments of the larger data unit. The method also includes transmitting the larger data unit via the determined transmit port.

In another embodiment, an apparatus for reassembling fragmented data units includes a packet forwarding pipeline. The packet forwarding pipeline includes a receive port unit to receive to receive data units. The packet forwarding pipeline also includes a forwarding engine to determine transmit ports for transmitting data units. The packet forwarding pipeline also includes a packet reassembly unit to determine if received data units are fragments of a larger data unit and to reassemble the larger data unit after receiving all of the fragments of the larger data unit, where the packet reassembly unit is located downstream from the forwarding engine in the packet forwarding pipeline. The packet forwarding pipeline also includes a transmit port unit to transmit the larger data unit via a transmit port determined by the forwarding engine.

BRIEF DESCRIPTION OF THE DRAWINGS

FIG. 4 is a block diagram illustrating an example reassembly context data structure;

DETAILED DESCRIPTION

Figure 1:
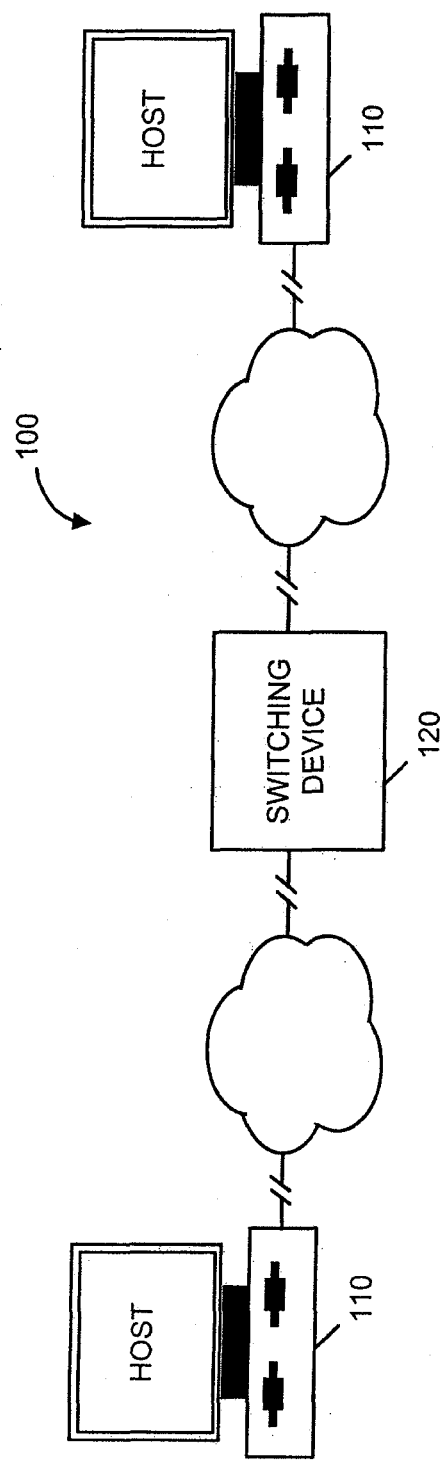
FIG. 1 is a block diagram of an example computer network system with fragmentation and reassembly capabilities.

FIG. 1 is a block diagram of an example computer network system 100 that includes fragmentation and reassembly capabilities. The computer network system 100 includes one or more interconnected hosts 110, such as personal computers, workstations, printers, and so on. The hosts 110 may be coupled to each other via a variety of networks, network devices and/or systems, e.g., switching devices 120, firewalls, modems, and so on. Switching devices 120 may be located at the edge of the network or may be part of the network backbone interconnecting different networks. The hosts 110 may communicate with each other by sending and receiving data in data units, e.g., packets, frames, datagrams, cells, and so on. A given host 110 may be a source host that transmits a communication. A given host 110 may also be a target host that receives the communication.

A given network, or a given network device or system, may impose a maximum size for a data unit that the network or the network device or system will support. This imposed maximum data unit size is commonly referred to as the Maximum Transmission Unit (MTU). The MTU may be based on a number of factors, including hardware capabilities of devices, requirements of particular protocols and/or standards, Quality of Service (QoS) constraints, and so on. For example, a given network may impose an MTU to prevent large data units from monopolizing a transmission medium for a significant period of time and thus delaying transmission of other data units. An MTU may be fixed by a standard (e.g., Ethernet) or decided at connect time, for example.

In some embodiments, when a particular data unit exceeds the size of an MTU of a particular network, the data unit may be fragmented into two or more fragments, where none of the fragments exceed the MTU, and the different fragments may be then treated as individual data units. For example, when a relatively large data unit arrives at an interface to a network with an MTU lower than the size of the data unit, the relatively large data unit may be divided into smaller fragments, and the individual fragments pass through the interface as separate data units. As a result, in some instances, a flow of data through a given interface may include a mix of fragments of different data units. Consequently, different data units may efficiently share the interface. Individual packets can be prevented from blocking the interface for a long period of time, and overall latency may generally be reduced.

A particular data unit may exceed the size of an MTU of a particular network (and thus require fragmentation) for a number of reasons. For example, a source host may transmit data units of size specified by a certain protocol, and that protocol may specify relatively large data units (as compared to the capacities of the networks through which these data units travel). Also, different protocols, such as tunneling protocols, may attach additional headers (e.g., tunnel headers) to data units, causing these data units to exceed an MTU of a network, even if the data unit would not exceed the MTUs in the absence of the attached header.

Fragmentation of data units may be performed at various points in the computer network system 100 and/or by various network devices and systems. For example, fragmentation may be performed by a switching device 120 when the switching device 120 receives a relatively large data unit and determines that the received data unit needs to be forwarded over a network with a relatively small MTU (e.g., an MTU that is smaller than the size of the received data unit). Alternatively, or in addition, a source host 110 that initially transmits a data unit (and chooses the size of the data in accordance with a particular protocol) may fragment the data unit if, for example, the source host 110 is coupled to a network with an MTU that is smaller than the size of the data unit.

Furthermore, fragmentation of data units may be performed at multiple points in the computer network system 100 and/or by multiple network devices and systems. For example, a source host 110 that initially transmits a data unit over a network that has an MTU smaller than the size of the transmitted data unit may break the data unit into fragments that do not exceed the MTU of the network and then transmit the individual fragments separately. As the fragments travel across the computer network system 100, the fragments themselves may be further fragmented into smaller fragments. For example, if a switching device 120 receives a fragment, and the switching device 120 determines that the received fragment needs to be forwarded over a network with an MTU that is smaller than the size of the fragment, the switching device 120 may further break the fragment into smaller fragments.

Fragments that travel across the computer network system 100 may be reassembled, e.g., back to the original data unit, at various points in the computer network system 100 and/or by various network devices and systems. For example, fragments may be reassembled at their final destination (e.g., by a target host 110). Alternatively, or in addition, fragments may be reassembled at various, and by multiple, intermediate network devices (e.g., switching devices 120) and/or systems. Details regarding reassembly of fragments will subsequently be described in more detail.

In some implementations, when data units are fragmented, data specific to fragmentation may be added to the resulting fragments (e.g., to the headers of the resulting fragments) to enable later reassembly. For example, the header of a fragment may include data that identifies the source host 110 of the data unit. The header of a fragment may further include data that identifies the original data unit associated with the fragment. In some embodiments, one or more combinations of fields of a fragment header may be combined or otherwise used to form a unique identifier of the original data unit associated with the fragment.

The header of a fragment may also include data that identifies which portion of the data from the original data unit is carried in the fragment. In some embodiments, for example, a fragment of a given data unit may carry in its header the position (e.g., in bytes) of the fragment in the data field of the original data unit (further referred to as "Offset"). Additional information that may be carried in the header of a fragment may include the total number of fragments associated with the data unit, the size of the fragment, some sort of an indicator (e.g., a Boolean field) that the fragment is, in fact, a fragment of a larger data unit, and so on. Some or all of the information inside the headers of fragments may be used by network devices (e.g., switching devices 120) and systems to reassemble the fragments, e.g., into the original data unit.

Figure 2:
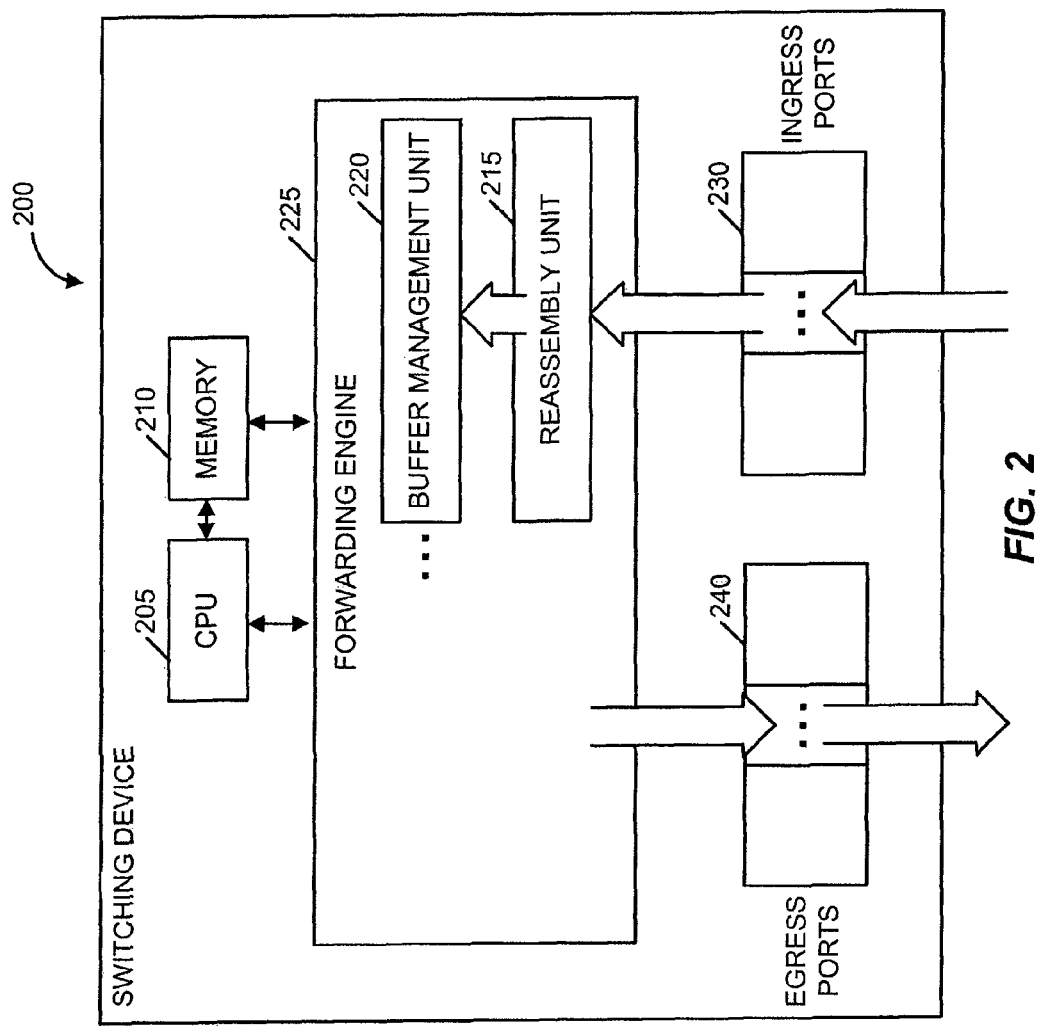
FIG. 2 is a block diagram of an example switching device configured to reassemble fragmented data units.

FIG. 2 is a simplified block diagram of an example switching device 200 that is configured to reassemble fragments. The switching device 200 may be utilized in the computer network system 100 as the switching device 120, for example. It will be understood, however, that the computer network system 100 may alternatively use another switching device 120.

The switching device 200 is generally a computer networking device that can connect two or more computer systems, network segments, subnets, and so on. For example, the switching device 200 may be a router. It should be understood, however, that the switching device 200 is not necessarily limited to a particular protocol layer or to a particular networking technology (e.g., Ethernet). For instance, the switching device 200 could be a bridge, a VPN concentrator, and so on.

The switching device 200 includes one or more ingress ports 230 and one or more egress ports 240. The ingress ports 230 are generally for receiving data units (e.g., packets), and the egress ports 240 are generally for transmitting data units. The ingress ports 230 and the egress ports 240 are coupled together via a forwarding engine 225, which generally transfers data units from the ingress ports 230 to appropriate egress ports 240, and which may perform additional packet processing functionalities. The switching device 200 also may include a central processing unit (CPU) 205 coupled to the forwarding engine 225. The CPU 205 may execute computer readable instructions stored in a memory 210 coupled to the CPU 205.

The forwarding engine 225 generally performs wire speed functions associated with transferring data units from ingress ports 230 to egress ports 240, whereas the CPU 205 generally performs functions that can tolerate higher latency. The memory 210 also may be coupled to the forwarding engine 225. The forwarding engine 225 may be implemented in hardware, e.g., on a single application specific integrated circuit (ASIC) coupled to the CPU 205. In other embodiments, other types of integrated circuits may be used such as a field programmable gate array (FPGA), a programmable logic array (PLA), a custom integrated circuit, etc. In other embodiments, the forward engine 225 may be implemented on multiple different integrated circuits that are coupled together.

The forwarding engine 225 further includes a reassembly unit 215 generally configured to reassemble fragments of data units, e.g., into a single data unit. Details regarding the operation of the reassembly unit 225 will subsequently be described in more detail.

The forwarding engine 225 further includes a buffer management unit 220 generally configured to allocate memory for storing data units and data unit fragments. As will be described in more detail below, the buffer management unit 220 enables data units and data unit fragments to be stored as data structures (e.g., linked lists of buffers).

Figure 3:
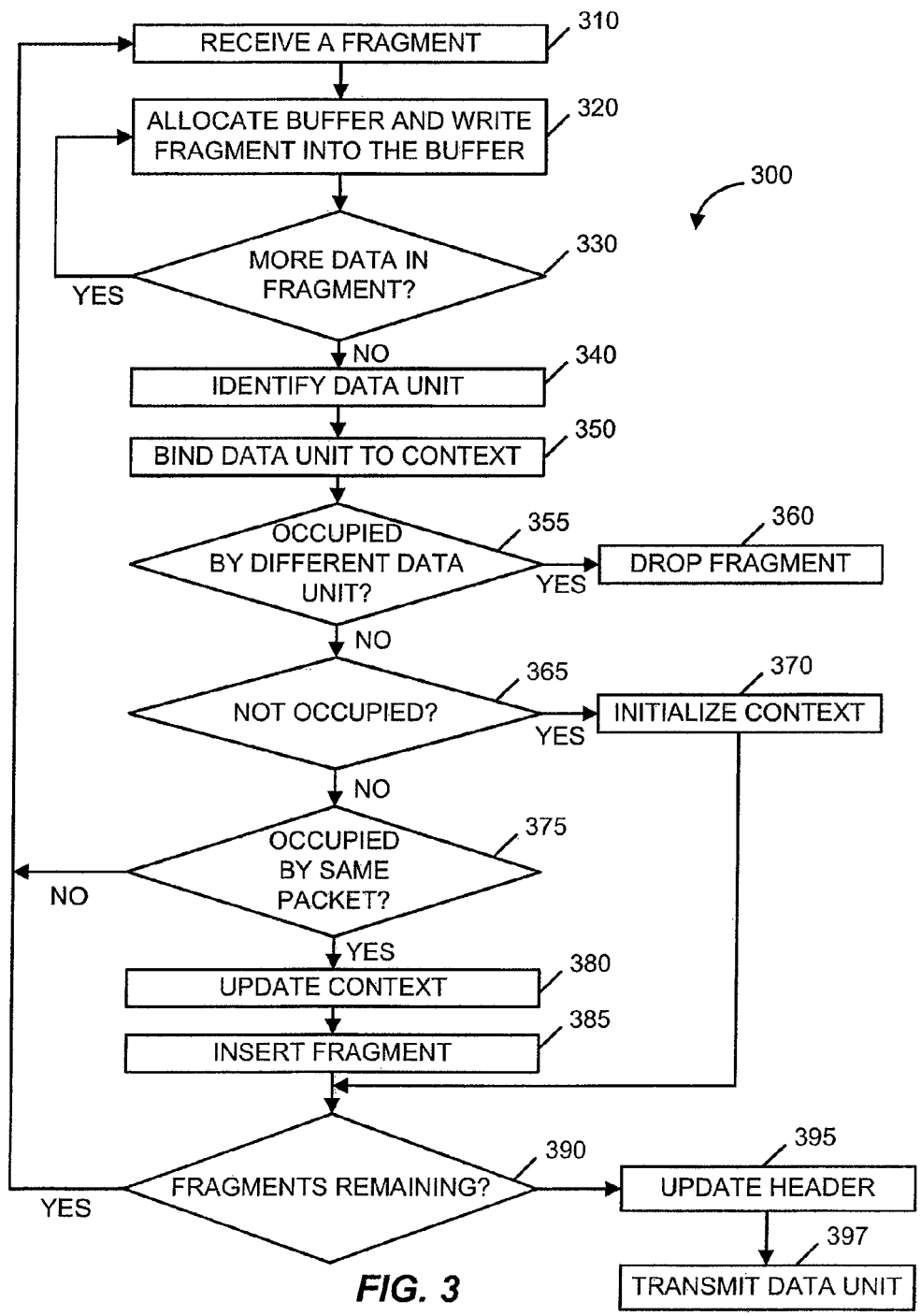
FIG. 3 is a flow diagram illustrating an example method of reassembling fragmented data units.

FIG. 3 is a flow diagram illustrating an example method 300 for reassembling fragments of data units that may be performed, for example, by the reassembly unit 215 and the buffer management unit 220 of FIG. 2. For ease of explanation, FIG. 3 will be described with reference to FIGS. 1-2. It will be understood, however, that the method 300 may be utilized with systems and devices other than those illustrated in FIGS. 1-2. It should also be noted that the method 300 is not limited to any particular protocol, any particular network layer, and so on. Accordingly, one of ordinary skill in the art will appreciate that the method 300 may be performed, for example, for reassembling fragmented IP packets, and/or for reassembling data units corresponding to protocol layers above the IP layer. For example reassembly of data units in accordance with the method 300 below may be performed on data units associated with the Lightweight Access Point Protocol (LWAPP), the Control and Provisioning of Wireless Access Points (CAPWAP) protocol, etc.

Referring now to FIG. 3, when a switching device (e.g., switching device 200, switching device 120) receives a fragment (block 310), the switching device may use the buffer management unit 220 to allocate a buffer in the memory 210 to store the fragment (block 320). In order to improve the efficiency of future hardware operations on the data in the buffer, the buffer may be a segment of the memory 210 with a predetermined fixed size. For example, at least a portion of the memory 210 may be partitioned into a plurality of segments of the same size or of varying sizes. If there is more data in the fragment than the buffer is able to store ("YES" branch of block 330), the buffer management unit 220 may allocate additional buffers in the memory 210 to store the fragment until there is no more data in the received fragment that needs to be stored ("NO" branch of block 330). The buffer management unit 220 may also associate the multiple buffers as a linked list. As a result, a single fragment may be stored in several buffers, e.g., as a linked list of buffers (herein after to as "fragment linked list"), where each buffer may be considered a node of the linked list. Storing a fragment in such a manner may generally improve efficiency of memory usage because different buffers may be allocated in various possible segments of memory that may be remote from one another. As a result, intermittent unused segments in memory may be filled with useful data, and larger blocks of memory may be left for more memory-intensive operations.

Once a fragment has been received and stored in one or more buffers (blocks 310-330), the original (i.e., unfragmented) data unit associated with the fragment may be identified (block 340). The original data unit may be identified in a number of ways. For example, in some embodiments, the original data unit associated with the fragment may be identified based, at least in part, on the data in the header of the fragment.

Once the original data unit associated the fragment is identified, the original data unit may be bound with a context entry in a reassembly context data structure (block 350). A reassembly context data structure generally includes information about different data units that may be used to reassemble those data units. In one implementation, each context entry in the reassembly context data structure corresponds to a unique data unit.

FIG. 4 illustrates an example reassembly context data structure 400. The reassembly context data structure 400 may be utilized in the method 300 for reassembling fragments of data units, for example. It will be understood, however, that the method 300 for reassembling fragments of data units may alternatively use another reassembly context data structure.

In some embodiments, the reassembly context data structure 400 includes a list of entries, where a given context entry may include information about a unique data unit that may be used for reassembling that data unit from its fragments. Data in the reassembly context data structure 400 may be dynamic. That is, for example, as new fragments corresponding to new data units arrive, entries in the reassembly context data structure 400 may be added and/or reconfigured. Likewise, once fragments are reassembled and transmitted, entries may be removed from the reassembly context data structure 400 to free up space for subsequent fragmented data units.

Each context entry in the reassembly context data structure 400, and, hence, each data unit may have a unique reassembly context index 410 in the reassembly context data structure 400. In general, the way reassembly context indices 410 are assigned to entries and/or to data units may depend on the implementation of the reassembly context data structure 400. In one embodiment, the reassembly context data structure 400 may be implemented as a table, indexed, for example, by the Logical Port, the Fragment ID, or some combination of the two. In such a case, reassembly context index 410 associated with a data unit may be the same as the unique identifier of the original data unit 420.

Alternatively, or in addition, the reassembly context data structure 400 may be implemented using a hash function that maps the unique identifier of the original data unit 420 to a reassembly context index 410. In order to avoid collisions (e.g., two or more different data units mapped to the same reassembly context index 410), a hash function may be used that has a relatively high probability of generating unique reassembly context indices 410. On example of such a function is the cyclic redundancy check (CRC) function. Accordingly, in some embodiments, a reassembly context index 410 of a data unit may be based on the CRC function, for example, of the parameters of the data unit (e.g., the Logical Port, the Fragment ID, or combination of the two).

In addition to the reassembly context index 410 and the unique identifier of the original data unit 420, a context entry in the reassembly context data structure 400 may include an availability indicator 430 (e.g., a Boolean value) indicative of whether or not that context entry is bound to some data unit. For example, if a given context entry is not bound to any data unit (e.g., the availability indicator is set to AVAILABLE), a new data unit (e.g., associated with the newly-arrived fragment) may be bound to that context entry in block 350 of FIG. 3 for the purpose of reassembly. Otherwise, the new data unit should to be bound to a different context entry in the reassembly context data structure 400.

The status of the availability indicator 430 may also be indicative of whether or not all of the fragments associated with a particular data unit have arrived. For example, in some embodiments, once all of the fragments associated with a particular data unit arrive, the availability indicator 430 may be set to AVAILABLE to allow other data units to bind with the corresponding context entry in the reassembly context data structure 400 for the purpose of reassembly. Therefore, if a given context entry in the reassembly context data structure 400 includes valid data, and the availability indicator 430 is set to UNAVAILABLE, it may, in some instances, be an indication that not all fragments of the corresponding data unit have arrived.

However, a context entry in the reassembly context data structure 400 may also include an aging indicator 450 that may generally indicate whether or not the data in the context entry is outdated. For example, data that remains in the context entry for a relatively long, predefined, period of time (e.g., longer than 100 ms) may be rendered outdated, and corresponding fragments may be dropped. In some embodiments, if data in a context entry bound to a data unit is rendered invalid, the context entry may become available to other data units.

A context entry in the reassembly context data structure 400 bound to a particular data unit may further include a reference to the first fragment 440 (e.g., a link to the first buffer of the fragment linked list) of that particular data unit. Other data may be included in a context entry of a reassembly context data structure 400, e.g., in the descriptor 460, associated with the context entry (and, hence, with the data unit corresponding to the context entry). Such data may include one or more Quality of Service (QoS) information associated with the data unit in question, forwarding preferences, priority information regarding the data in the data unit, number of fragments associated with the data unit, and other information that may appear, for example, in the header of a received fragment.

Referring back to the method 300 for reassembling fragments illustrated in FIG. 3, binding the original data unit (identified in block 320) with a context entry in a reassembly context data structure 400 (block 350) may yield various results. For example, the context entry may already be occupied by a different data unit. This may be inferred, for example, from the availability indicator 420 of the context entry being set to UNAVAILABLE and the unique identifier of the original data unit 420 being stored in the context entry not matching the identified data unit in block. If the context entry in the reassembly context data structure 400 is occupied by a different data unit ("YES" branch of block 355), the fragment received in block 310 may be dropped (block 360).

If the context entry in the reassembly context data structure 400 is not occupied by a different data unit ("NO" branch of block 355), the context entry may be occupied by the data unit associated with the received fragment. It may also be unoccupied. If the context entry is unoccupied ("YES" branch of block 365), it may be an indication that the fragment received in block 310 is the first received fragment of a new data unit. Accordingly, the context entry in the reassembly context data structure 400 corresponding to the new data unit may be initialized (block 370). Initialization of a context entry may include setting the availability indicator 430 to UNAVAILABLE (e.g., to indicate that more fragments are expected to arrive, to prevent other data units from binding to the same context entry, and so on). Initialization may further include writing various data (e.g., byte count, data unit identifier, and so on) to the reassembly context data structure 400. Furthermore, initialization may include setting the reference to first fragment 440 in the context entry to point to the first buffer of the fragment linked list (even, in some embodiments, if the received fragment is not the first fragment for the associated data unit), resetting the aging indication 450, and so on.

On the other hand, if the context entry in the reassembly context data structure 400 is occupied by the same data unit ("YES" branch of block 355), it may be an indication that the fragment received in block 310 is not the first received fragment for that data unit. Accordingly, the context entry in the reassembly context data structure 400 may be updated with new information (block 380). For example, if the received fragment is sequentially the first fragment of the data unit, the reference to first fragment 440 in the context entry may be changed to reference the first buffer of the fragment linked list stored in blocks 310-330 in response to the received fragment. On the other hand, if the received fragment is cumulatively the last fragment of the data unit, the availability indicator 430 may be set to AVAILABLE (e.g., to indicate that no more fragments for the data unit are expected to arrive, to allow other data units to bind to the same context entry, and so on).

Moreover, if the received fragment is not the first received fragment for that data unit, the reassembly unit 215 and the buffer management unit 220 may cooperate to bind the fragment linked list with the fragment linked list corresponding to the other fragment to create a data unit linked list (as opposed to a fragment linked list) of received fragments (block 385). Each fragment linked list may be considered a node of the data unit linked list. Alternatively, the buffers of the various fragments may be considered nodes of the data unit linked list. Binding linked lists may be performed using a number of suitable linked list manipulation methods, for example. For ease of explanation, consider an example where a data unit is fragmented into two fragments, and one of the fragments has already arrived and was processed in accordance with the method 300 discussed in reference to FIG. 3. When the second fragment arrives, binding may be performed as follows. If it is determined (e.g., by looking at the information in the headers of the received fragments), that the second fragment that is received is also sequentially the second fragment of the data unit, the beginning of the second fragment linked list may be bound to the end of the first fragment linked list. This may be done, for example, by simply pointing the end of the last buffer of the first fragment linked list to the beginning of the first buffer of the second fragment linked list. On the other hand, if it is determined that the second fragment that is received is sequentially the first fragment of the data unit, the beginning of the first fragment linked list may be bound to the end of the second fragment linked list.

The method 300 may continue while there remain fragments associated with the data unit that have not been received ("YES" branch of block 390). When no such fragments remain ("YES" branch of block 390), the reassembled data unit, in the form of the data unit linked list (which is a linked list of fragment linked lists), for instance, may be transmitted by the switching device 200. In some embodiments, prior to transmitting the reassembled data unit, the header of the data unit may be updated (block 395). For example, the total byte count listed in the header may be updated to be the total byte count of the reassembled data unit instead of the total byte count of the first fragment.

In some embodiments, as the reassembled data unit is transmitted, some data in the data unit linked list, particularly invalid data, may be skipped. Examples of invalid data include headers of fragments that are not the first fragments of a data unit, data in the unused space of the buffers (i.e., data between the end of a fragment and the end of the allocated buffer) and so on.

Figures 5A, 5B:
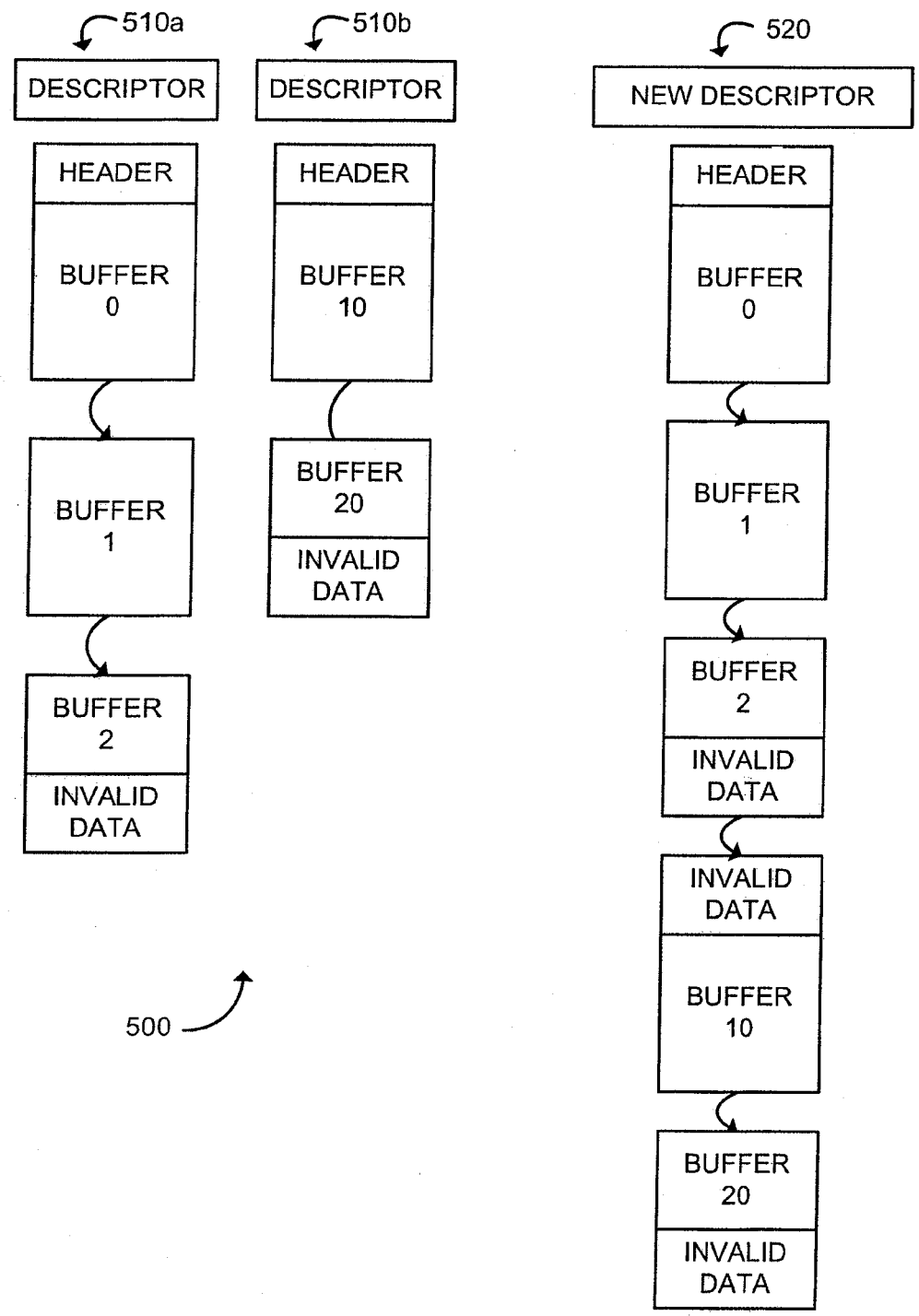
FIG. 5A is a block diagram illustrating an example fragmented data unit.
FIG. 5B is a block diagram illustrating an example reassembled data unit.

FIG. 5A illustrates an example fragmented data unit 500. For ease of explanation, the illustrated fragmented data unit 500 includes two fragments 510a, 510b. Each fragment is stored as a fragment linked list. Each fragment may have a corresponding descriptor with various information about the respective fragment as discussed above. In other implementations that do not utilize packet descriptors, information about each fragment may be stored separately from the fragment and be associated with the fragment. In the example of FIG. 5A, each fragment 510 includes invalid data in the corresponding last buffer.

FIG. 5B illustrates an example reassembled data unit 520. The reassembled data unit 520 is reassembled from the two fragments 510a, 510b in FIG. 5A. During reassembly, the second fragment 510b is bound to the first fragment 510a by pointing the last buffer of the first fragment 510a to the first buffer of the second fragment 510b. Furthermore, a new descriptor may be formed that includes various information about the reassembled data unit, such as its length, priority, QoS parameters, and so on. Information in the new descriptor may be created based on the information from the descriptors of individual fragments as discussed above. In other implementations that do not utilize packet descriptors, information corresponding to and associated with the reassembled packet similarly may be created based on the associated information corresponding to the individual fragments.

The result of the reassembly is a data unit linked list, where each node of the data unit linked list is a fragment of the data unit. The data unit linked list includes invalid data. For example, the reassembled data unit 520 includes the invalid data in the respective last buffers of the fragments 510. Additionally, the header of the second fragment 510b is now considered invalid data with respect to the reassembled data unit. When the reassembled data unit 520 is to be transmitted, the invalid data is not read out of the buffers. For example, length information in the header of the first fragment may be utilized to determine when all of the valid data of the first fragment has been read from the buffers 1 and 2. Using this length information, reading from the buffer 2 can stop and thus the invalid data in buffer 2 can be skipped. Next, reading the next fragment out of the buffers 10 and 20 can commence. But it is known that the beginning of buffer 10 corresponds to a second fragment header, and that this information should not be included as part of the reassembled data unit (i.e., it is invalid data). The length of the second fragment header is also known, and this information can be used to skip this header information and to commence reading data out of the buffer 10 after the end of the second fragment header. Similar to the first fragment, length information in the header of the second fragment may be utilized to determine when all of the valid data of the second fragment has been read from the buffers 10 and 20. Using this length information, reading from the buffer 20 can stop and thus the invalid data in buffer 20 can be skipped.

Figure 6A:
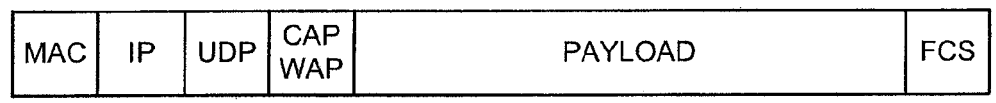
FIG. 6A is a diagram illustrating a data unit including a CAPWAP header.
Figure 6B:
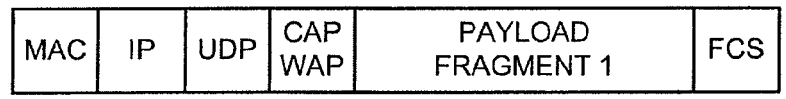
FIGS. 6B and 6C are diagrams illustrating the data unit of FIG. 6A after CAPWAP fragmentation.
Figure 6C:
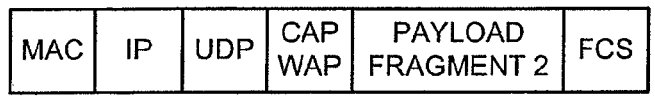

The headers illustrated in FIGS. 5A-5B may correspond to a variety of protocols, including protocols above the IP layer, and tunneling headers. For instance, reassembly may be performed on data units corresponding to the CAPWAP protocol, which is in a higher layer above the IP protocol layer in the protocol stack. FIG. 6A illustrates a data unit including a CAPWAP header. Addition of the CAPWAP header to an IP packet may, in some instances, cause the data unit to exceed the MTU of a network, thus requiring fragmentation. One type of fragmentation that may be applied is CAPWAP fragmentation, as illustrated in FIGS. 6B and 6C. In CAPWAP fragmentation, fragments are marked in the CAPWAP headers in FIGS. 6B and 6C. For example, the CAPWAP headers of the fragments may include information such as a fragment ID, a fragment offset, and an indication of whether a fragment is the last fragment. Such information can be utilized to reassemble the CAPWAP data unit of FIG. 6A.

Figure 7:
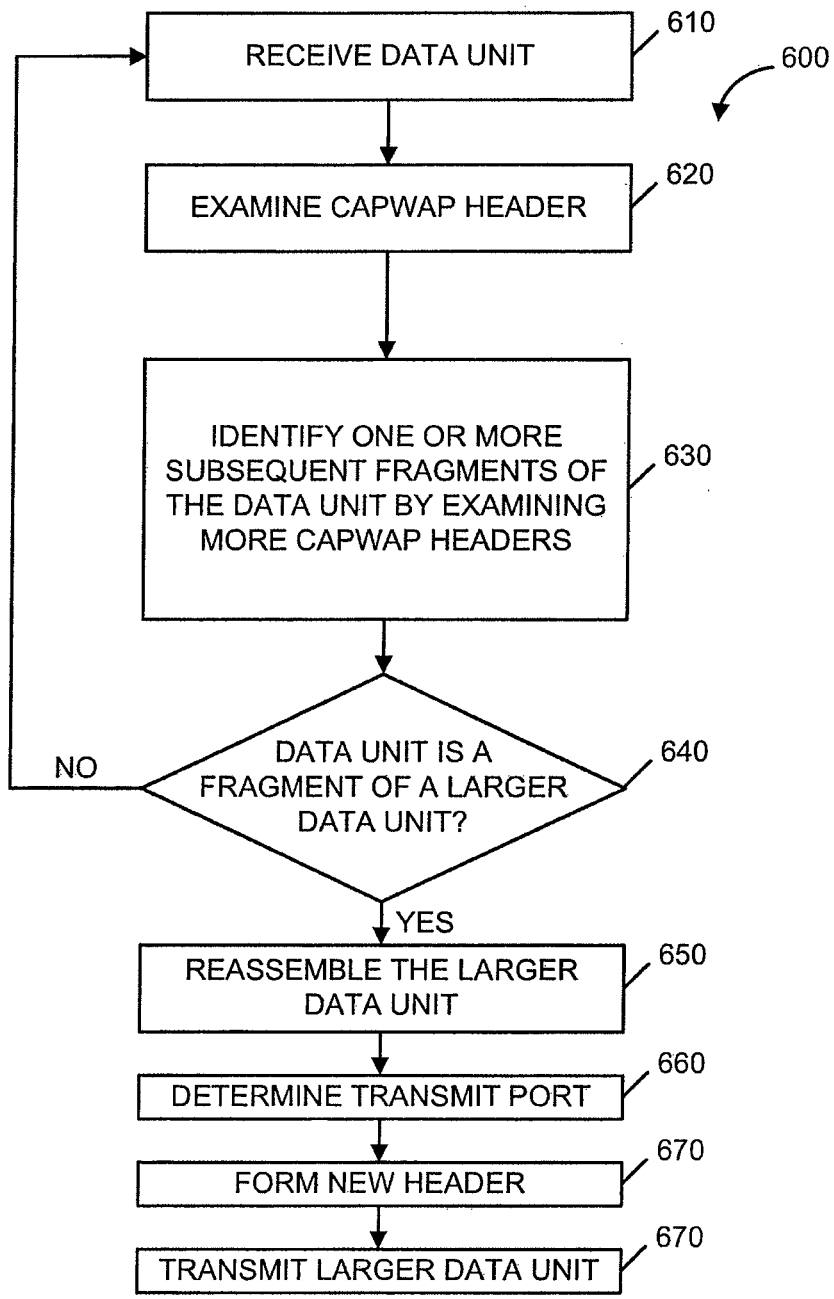
FIG. 7 is a flow diagram illustrating another example method of reassembling fragmented data units.

FIG. 7 illustrates an example method 600 of reassembling CAPWAP fragmented data units. As explained previously, one instance when data units may be fragmented, and thus require reassembly, is when additional tunneling headers are attached to the data units. The reassembly unit (e.g., reassembly unit 215) may receive a data unit (block 610). The reassembly unit may examine the CAPWAP header of the data unit to determine if the data unit is a fragment of a larger data unit (block 620). The reassembly unit may identify one or more subsequent fragments of the larger data unit by examining one or more CAPWAP headers in data units. If the reassembly unit determines that the data unit is a fragment of a larger data unit ("YES" branch in block 640), the reassembly unit may instruct the buffer management unit to reassemble the larger data unit after receiving one or more subsequent fragments of the larger data unit (block 650). The forwarding engine may then determine a transmit port from which to transfer the data unit (block 660). The reassembly unit may create a new header for the reassembled data unit (block 670) and the larger data unit may be transmitted via the determined transmit port. (block 680).

Figure 8A:
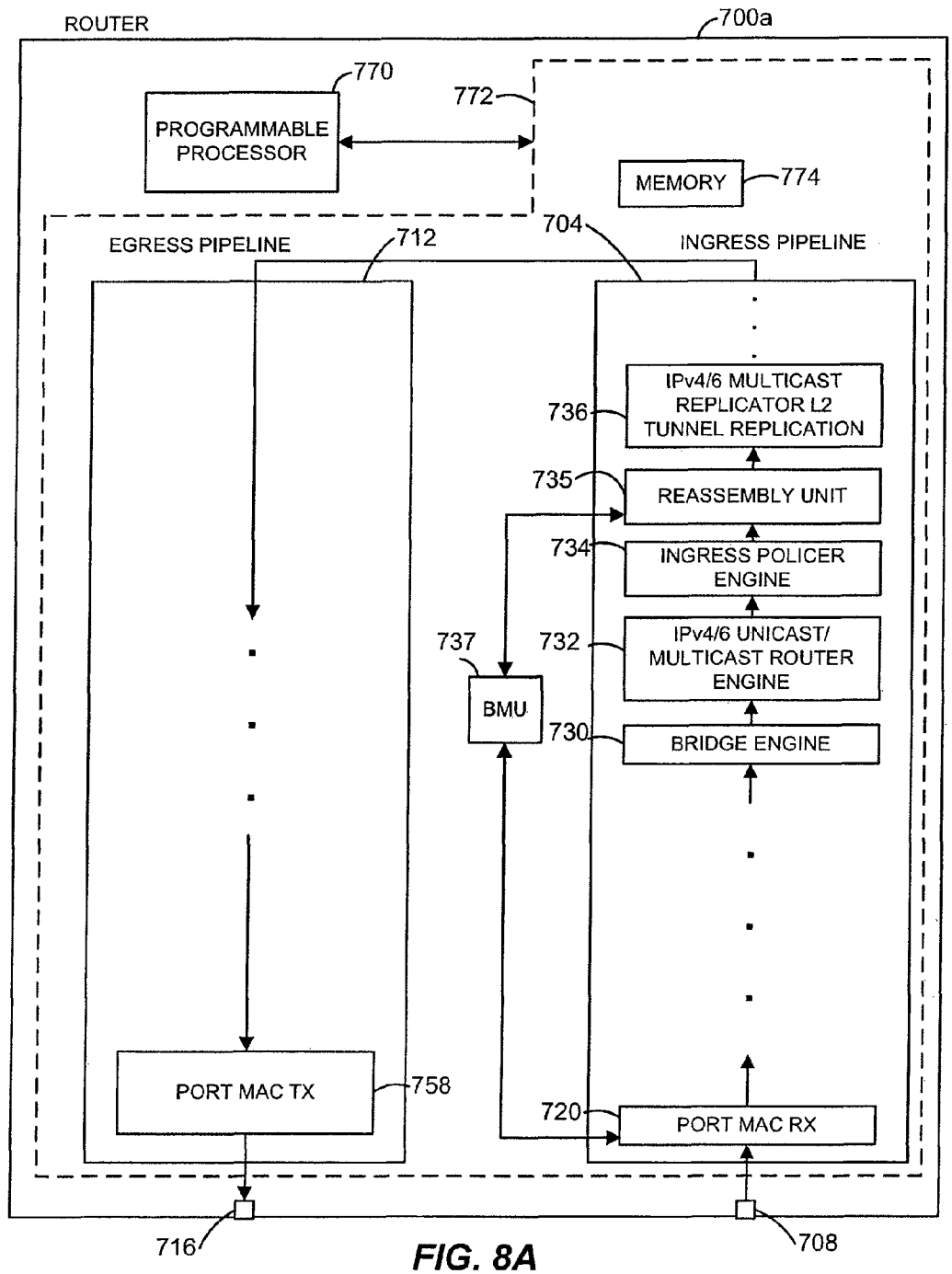
FIG. 8A is a block diagram of an example router that includes capabilities for reassembling fragmented data units.
Figure 8B:
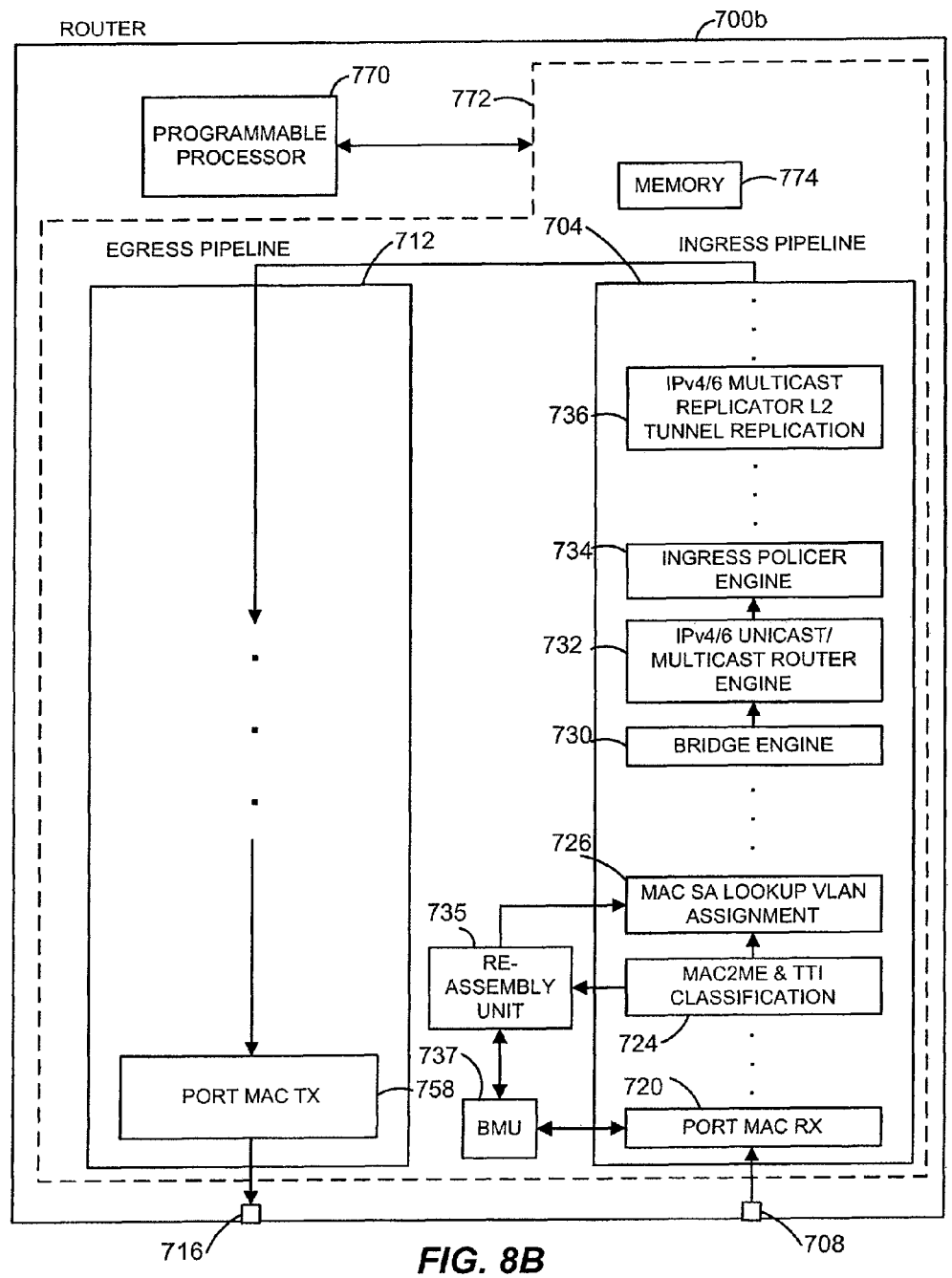
FIG. 8B is a block diagram of another example router that includes capabilities for reassembling fragmented data units.

FIGS. 8A-8B are simplified block diagrams of other example routers 700a, 700b, respectively, that include capabilities for reassembly of fragmented data units. Referring to FIG. 8A, the router 700a includes a pipeline that may be implemented as an ingress pipeline 704 and an egress pipeline 712. The ingress pipeline 704 is coupled to one or more input circuits 708, and the egress pipeline 712 is coupled to one or more output circuits 716. Additionally, the ingress pipeline 704 and the egress pipeline 712 are coupled together. The input circuits 708 and the output circuits 716 may be coupled to one or more networks such as a wide area network (WAN), a local area network (LAN), such a wired LAN or a wireless LAN (WLAN), etc. The one or more input circuits 708 are for receiving data units such as packets. Similarly, the one or more output circuits are for transmitting data units. The ingress pipeline 704 and the egress pipeline 712 generally transfer packets of data from the input circuits 708 to appropriate ones of the output circuits 716. The one or more input circuits 708 may correspond to one or more input ports of the router 700a, and the one or more output circuits 716 may correspond to one or more output ports of the router 700.

As shown in FIG. 8A, the ingress pipeline 704 and the egress pipeline 712 each include a plurality of units coupled in series. Generally, each unit of a pipeline optionally processes a packet descriptor corresponding to a packet, or some other information associated with the packet, or the packet itself, and then passes the packet descriptor, the associated information, or the packet, to the next unit in the pipeline. For ease of explanation, the following description will refer only to processing and passing packet descriptors. A packet descriptor may include some information from the packet, such as some or all of the header information of the packet. The packet descriptor may include other information as well such as an indicator of where the packet is stored in a memory associated with the router 700a. Each unit may or may not process a particular packet descriptor. For example, in some instances, a unit may simply forward a packet descriptor onto the next unit in the pipeline. The last unit of the ingress pipeline 704 passes the packet descriptor to the first unit of the egress pipeline 712.

Each or at least some of the units of the ingress pipeline 704 and the egress pipeline 712 may include, or otherwise be associated with, a corresponding memory. A packet descriptor received by a unit may be stored in the memory associated with the unit.

The ingress pipeline 704 includes a port media access control (MAC) receiver unit 720 coupled to the input circuits 708. The port MAC receiver unit 720 generally implements media access control functions. The MAC receiver unit 720 interacts with a buffer management unit (BMU) 737, which allocates buffers in memory for storing packets received by the router 700a. The buffer management unit 737 may, for example, but does not have to, be the same as or similar to the buffer management unit 220 illustrated in FIG. 2. The MAC receiver unit 720 may store packets in the buffers allocated by the BMU 737 as linked lists. If a packet is a fragment of a larger data unit, the linked list corresponding to such a packet may be referred to as a fragment linked list.

A bridge engine 730 is coupled to the port MAC receiver unit 720 via one or more other ingress pipeline units, which are omitted from FIG. 8A for ease of explanation and so as not to obscure teachings of the present application. The bridge engine 730 includes, or is coupled to, a forwarding database (not shown) that includes MAC destination addresses and indications of their corresponding network segments. The bridge engine 730 generally handles the forwarding of packets destined for a segment of a network to which the router 700a is connected. The bridge engine determines whether a received packet should be forwarded to a different network segment and, if so, to which network segment the packet should be forwarded. Determination of whether, and to where a packet should be forwarded, may be done by examining the MAC destination address of the packet and determining to which network segment the destination address corresponds using the forwarding database. Also, other information may be utilized as well, such as ULAN information. The bridge engine 730 also may maintain the forwarding database.

A router engine 732 is coupled to the bridge engine 730. If a received packet is not destined for a network to which the router 700a is connected, then routing based on an Internet Protocol (IP) address may be performed. The router engine 732 includes, or is coupled to, a routing information database (not shown) that includes information corresponding to where IP packets should be forwarded. The router engine 732 generally determines to where a received IP packet should be routed. This may be done by examining the IP destination address of the packet and routing information stored in the routing information database. The router engine 732 also maintains the routing information database. In an embodiment, the router engine 732 may be compliant with IP version 4 (v4) and IP version 6 (v6). Of course, in other embodiments, the router engine 732 additionally or alternatively may be compliant with one or more other IP versions including previous IP versions and IP versions not yet standardized. Additionally, the router engine 732 may be capable of determining destinations for multicast packets.

An ingress policer engine 734 may be coupled to the router engine 732. The ingress policer engine 734 generally performs rate limiting and makes flow traffic measurements. The ingress policer engine 734 also may sample packets.

A reassembly unit 735 may be coupled to the ingress policer engine 734. The reassembly unit 735 is generally configured to reassemble fragments of data units, e.g., into a single reassembled data unit. The reassembly unit 735 may have features similar to the reassembly unit 215 described in reference to FIG. 1-6C. However, it should be noted that the router 700a may use a reassembly unit 735 other than that discussed in reference to FIGS. 1-6C. The reassembly unit 735 may be coupled to the BMU 737 and may cooperate with the BMU 737 to create data unit linked lists.

As illustrated in FIG. 8A, the reassembly unit 735 is located towards the end of the ingress pipeline 704, after much ingress processing of a packet header has already been done. After a first fragment is identified, subsequent fragments can skip several units in the ingress pipeline 704, such as units 730 and 732. For example, the bridge engine 730 may process a first fragment of a data unit and skip processing subsequent fragments of the data unit. On the other hand, the reassembly unit 735 can hold onto a packet descriptor corresponding to a data unit undergoing reassembly until the reassembly process is completed. Then, the reassembly unit 735 may release the descriptor corresponding to the reassembled packet for further processing by the ingress pipeline 704 and the egress pipeline 712.

A multicast replicator 736 may be coupled to the reassembly unit 735. The multicast replicator 736 generally replicates multicast packets, if necessary, for forwarding via multiple output circuits 716. The multicast replicator 736 may be compliant with IP v4 and IP v6, for example. Additionally, the multicast replicator 736 may support a multicast extension to the Layer Two Tunneling Protocol (LTTP).

The egress pipeline 712 may include a plurality of pipeline units that have been omitted from FIG. 8A for ease of explanation and so as not to obscure the teachings of the present application. The egress pipeline may include a port MAC transmit unit 758. The port MAC transmit unit 758 generally implements media access control functions and forwards packets to the output circuits 716. The port MAC transmit unit 758 uses data unit link lists and fragment link lists to read out reassembled packets from memory. As described above, reading out reassembled packets from memory may include skipping invalid data.

In other embodiments, the reassembly unit 735 may be located at different locations of the ingress pipeline 704. For instance, referring to FIG. 8B, the reassembly unit 735 may be coupled to a MAC2ME & TTI classification unit 724 and to a MAC SA lookup VLAN assignment unit 726. The MAC2ME & TTI classification unit 724 is also coupled to the port MAC receiver unit 720. The MAC2ME & TTI classification unit 724 generally performs two lookup functions. In a first lookup function (a MAC2ME lookup), packets that are destined to a MAC address, VLAN pair associated with the router 700 may be identified. This identification may be used in one or more subsequent functions or pipeline units. A second lookup function (a tunnel termination interface (TTI) lookup) may be used for tunnel termination identification and/or classifying a logical interface according to L2 or L3 header fields. The TTI lookup may indicate that the packet should be associated with one or more TTI actions, such as assigning a VLAN identifier, quality of service (QoS) parameters, etc., to the packet. A MAC source address (SA) lookup virtual LAN (VLAN) assignment unit 726 is coupled to the MAC2ME and TTI classification unit 724. The MAC SA lookup VLAN assignment unit 726 generally uses the MAC source address in a packet header, and possibly other information, to determine to which VLAN, if any, a particular packet belongs.

Referring now to FIGS. 8A and 8B, the router 700a also includes a programmable processor 770 coupled to the ingress pipeline 704 and the egress pipeline 712. The programmable processor 770 may be implemented by a central processing unit (CPU) configured according to computer readable instructions stored on a memory coupled to the CPU. On the other hand, the ingress pipeline 704, the egress pipeline 712, and other units of the router 700a described above may be implemented on a single application specific integrated circuit (ASIC) 772 coupled to the CPU. In other embodiments, other types of integrated circuits may be used such as a field programmable gate array (FPGA), a programmable logic array (PLA), a custom integrated circuit, etc. In other embodiments, the ingress pipeline 704 and the egress pipeline 712 or various modules in the pipelines 704, 712 may be implemented on multiple different integrated circuits that are coupled together. With the inclusion of the reassembly unit 735 in the hardware portion (e.g., the ASIC 772) of the router 700, packet reassembly can be performed in the hardware pipeline and without resorting to sending fragments to the programmable processor 770 for reassembly.

The router 700a also may include a memory 774 for storing packets. The BMU 737 may allocate buffers (segments in the memory 774, for example) for packets, and the port MAC receiver unit 720 may store packets in the allocated buffers. Thus, the port MAC receiver unit 720 and the BMU 737 generally interact in order to store a packet fragment as a linked list of buffers. The memory 774 is coupled to the ingress pipeline 704, the egress pipeline 712, and the programmable controller 770. The memory 774 may be included on the ASIC 772. In other implementations, however, the memory 774 may be on an IC separate from the ASIC 772.

Generally, the ASIC 772 operates at wire speed whereas the programmable processor 770 may operate at a much slower speed. For example, packet fragments may be reassembled at wire speed. On the other hand, other types of functions may be implemented by the programmable processor 770, operating at a speed slower than wire speed.

Although packet reassembly techniques were described above with reference to the router 700a, these techniques may be utilized in other types of packet forwarding devices such as routers different than the router 700, network bridges, etc. Moreover, while the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. An apparatus, comprising:
a packet forwarding pipeline, including:
a receive port unit to receive data units via a first network link;
a packet reassembly unit to determine if received data units are fragments of a larger data unit and to reassemble the larger data unit after receiving all of the fragments of the larger data unit
a forwarding engine to determine transmit ports for transmitting data units, wherein the forwarding engine is configured (i) to determine one or more transmit ports for the larger data unit based on a first received fragment of the larger data unit and prior to the packet forwarding pipeline receiving all of the fragments of the larger data unit, and (ii) to skip processing fragments of the larger data unit received subsequent to receiving the first received fragment of the larger data unit;

wherein the packet reassembly unit is in series with the forwarding engine in the packet forwarding pipeline and located downstream from the forwarding engine in the packet forwarding pipeline; and a transmit port unit to transmit the larger data unit via a transmit port determined by the forwarding engine and via a second network link coupled to the transmit port.

2. The apparatus of claim 1, wherein the receive port unit is configured to store the fragments of the larger data unit in a memory, including storing at least one of the fragments in at least two different segments of the memory as a fragment linked list;

wherein the packet reassembly unit is configured to create a data unit linked list corresponding to the plurality of fragments stored in the memory; and wherein the transmit port unit is configured to transmit the larger data unit using the data unit linked list and the fragment linked list.

3. The apparatus of claim 1, wherein the packet reassembly unit is configured to examine headers in received data units to determine if the received data units are fragments of the larger data unit, wherein the headers correspond to a protocol layer above an IP layer.

4. The apparatus of claim 1, wherein the packet reassembly unit is in a hardware portion of the apparatus; and wherein the apparatus further comprises a programmable processor coupled to the hardware portion of the apparatus; and wherein the packet reassembly unit is configured to reassemble the larger data unit without sending the packet fragments to the programmable processor.

5. A network switching device, comprising:

a memory;

a receive port unit coupled to a first network link, wherein the receive port unit includes a receive port configured to (i) receive data units via the first network link and (ii) store the received data units in the memory, including storing in the memory a set of data units received via the first network link, the set of data units corresponding to a fragmented larger data unit from a source host device separate from the network switching device and destined for a target host device separate from the network switching device, wherein each data unit in the set includes a header at or below the IP layer in a protocol stack, and a header above the IP layer in the protocol stack;

wherein the receive port unit is configured to store at least one of the data units in the set of data units in at least two different segments of the memory as a fragment linked list;

a packet reassembly unit configured to reassemble the set of data units into the larger data unit by (i) examining headers above the IP layer in the set of data units, and (ii) creating a data unit linked list corresponding to the set of data units using information from the headers above the IP layer in the set of data units;

a forwarding engine configured to determine a transmit port via which to transmit each of at least some of the data units received via the first network link, wherein the forwarding engine is configured to determine a transmit port, from a plurality of ports, for the reassembled larger data unit based on information from at least one of (i) a header at the IP layer, or (ii) a header below the IP layer; and a transmit port unit configured to transmit the reassembled larger data unit stored in the memory via the determined transmit port, and via a second network link coupled to the determined transmit port, using the data unit linked list and the fragment linked list.

6. The network switching device of claim 5, wherein the forwarding engine is configured to determine the transmit port for the larger data unit based on a header in a first received data unit in the set of data units.

7. The network switching device of claim 5, wherein the forwarding engine is configured to determine the transmit port for the larger data unit based on a header in a data unit in the set of data units other than a first received data unit in the set of data units.

8. The network switching device of claim 5, further comprising a buffer management unit coupled to the receive port unit, wherein the buffer management unit is configured to allocate segments of the memory for storing data units.

9. The network switching device of claim 8, wherein the buffer management unit is configured to allocate segments of the memory of one or more predetermined lengths.

10. The network switching device of claim 5, wherein the packet reassembly unit is configured to create a first fragment linked list corresponding to a first plurality of segments of the memory in which a first data unit in the set of data units is stored, create a second fragment linked list corresponding to a second plurality of segments of the memory in which a second data unit in the set of data units is stored, create the data unit linked list by binding the first fragment linked list with the second fragment linked list.

11. The network switching device of claim 10, wherein the packet reassembly unit is configured to link the end of a memory segment corresponding to the first fragment linked list with a beginning of a memory segment corresponding to the second fragment linked list.

12. The network switching device of claim 11, wherein the memory segment corresponding to the first fragment linked list includes invalid data prior to the end of the memory segment corresponding to the first fragment linked list; and wherein the transmit port unit is configured to skip the invalid data while reading out the larger data unit stored in the memory.

13. The network switching device of claim 11, wherein the memory segment corresponding to the second fragment linked list includes invalid data at the beginning of the memory segment corresponding to the second fragment linked list; and wherein the transmit port unit is configured to skip the invalid data while reading out the larger data unit stored in the memory.

14. The network switching device of claim 5, wherein the packet reassembly unit is in a hardware portion of the apparatus; and wherein the apparatus further comprises a programmable processor coupled to the hardware portion of the apparatus; and wherein the packet reassembly unit is configured to create the data unit linked list without sending the packet fragments to the programmable processor.

15. The network switching device of claim 5, wherein the header corresponds to the Lightweight Access Point Protocol (LWAPP) protocol.

16. The network switching device of claim 5, wherein the packet reassembly unit is in a hardware portion of the apparatus; and
- wherein the apparatus further comprises a programmable processor coupled to the hardware portion of the apparatus; and
- wherein the packet reassembly unit is configured to reassemble the larger data unit without sending the packet fragments to the programmable processor.

* * * * *